United States Patent
Jung et al.

(10) Patent No.: US 10,506,504 B2
(45) Date of Patent: *Dec. 10, 2019

(54) DISCOVERY METHOD AND AN ELECTRONIC DEVICE THEREOF

(71) Applicant: Samsung Electronics Co., Ltd., Gyeonggi-do (KR)

(72) Inventors: Bu-Seop Jung, Gyeonggi-do (KR); Young-Kwan Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,198

(22) Filed: Oct. 5, 2018

(65) Prior Publication Data

US 2019/0053141 A1 Feb. 14, 2019

Related U.S. Application Data

(63) Continuation of application No. 15/648,927, filed on Jul. 13, 2017, now Pat. No. 10,111,161, which is a (Continued)

(30) Foreign Application Priority Data

Nov. 25, 2014 (KR) .................. 10-2014-0165439

(51) Int. Cl.
*H04W 4/00* (2018.01)
*H04W 48/16* (2009.01)
(Continued)

(52) U.S. Cl.
CPC .......... *H04W 48/16* (2013.01); *H04W 8/005* (2013.01); *H04W 8/24* (2013.01);
(Continued)

(58) Field of Classification Search
USPC .................................. 370/328, 320
See application file for complete search history.

(56) References Cited

U.S. PATENT DOCUMENTS 9,143,979 B1 * 9/2015 Lambert ........... H04W 28/0289
9,307,507 B2 * 4/2016 Zhou ..................... H04W 40/12
(Continued)

FOREIGN PATENT DOCUMENTS

| CN | 101496317 | 7/2009 |
| CN | 104053227 | 9/2014 |

(Continued)

OTHER PUBLICATIONS

International Search Report dated Mar. 11, 2016 issued in counterpart application No. PCT/KR2015/012690, 8 pages.
(Continued)

*Primary Examiner* — David Q Nguyen
(74) *Attorney, Agent, or Firm* — The Farrell Law Firm, P.C.

(57) ABSTRACT

A portable electronic device operable in a wireless local area network and a non-transitory machine-readable storage device are provided. The portable electronic device includes communication circuitry to support a neighbor awareness networking in relation with the wireless local area network; and a processor configured to detect, using the communication circuitry, an electronic device external to the portable electronic device; transmit, using the communication circuitry, information to the electronic device, wherein the information includes a plurality of bits indicating an interval between a plurality of discovery windows in which the portable electronic device is to be operated in a wake-up state with respect to the neighbor awareness networking; adjust the interval based at least in part on a power state with respect to the portable electronic device; and transmit
(Continued)

another information indicating the adjusted interval to the electronic device.

20 Claims, 15 Drawing Sheets

Related U.S. Application Data continuation of application No. 14/950,893, filed on Nov. 24, 2015, now Pat. No. 9,749,940.

(51) Int. Cl.
*H04W 8/24* (2009.01)
*H04W 8/00* (2009.01)
*H04W 52/02* (2009.01)
*H04W 76/11* (2018.01)

(52) U.S. Cl.
CPC ........ *H04W 52/0229* (2013.01); *H04W 76/11* (2018.02); *H04W 52/0216* (2013.01); *H04W 52/0261* (2013.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/22* (2018.01)

(56) References Cited

U.S. PATENT DOCUMENTS

| | | | |
|---|---|---|---|
| 9,820,131 | B2 | 11/2017 | Abraham |
| 10,178,669 | B2 | 1/2019 | Du et al. |
| 2010/0190459 | A1 | 7/2010 | Li |
| 2011/0153773 | A1 | 6/2011 | Vandwalle et al. |
| 2012/0320790 | A1 | 12/2012 | Shaffer et al. |
| 2014/0198725 | A1 | 7/2014 | Abraham |
| 2014/0254569 | A1 | 9/2014 | Abraham et al. |
| 2014/0293992 | A1 | 10/2014 | Abraham et al. |
| 2014/0313966 | A1 | 10/2014 | Shukla et al. |
| 2014/0321317 | A1 | 10/2014 | Kasslin et al. |
| 2014/0328168 | A1* | 11/2014 | Park .................. H04W 74/0808 370/230 |
| 2015/0131529 | A1 | 5/2015 | Zhou |
| 2015/0223047 | A1* | 8/2015 | Abraham .......... H04W 52/0216 370/328 |
| 2015/0365835 | A1 | 12/2015 | Segev |
| 2015/0382301 | A1 | 12/2015 | Huang |
| 2017/0026282 | A1 | 1/2017 | Huang |
| 2017/0111849 | A1 | 4/2017 | Park |
| 2017/0127342 | A1 | 5/2017 | Park |
| 2017/0127436 | A1* | 5/2017 | Li ..................... H04W 72/1215 |
| 2019/0174400 | A1* | 6/2019 | Park ..................... H04W 48/16 |

FOREIGN PATENT DOCUMENTS

| | | |
|---|---|---|
| WO | WO 2014/109874 | 7/2014 |
| WO | WO 2014/109875 | 7/2014 |
| WO | WO 2014/176079 | 10/2014 |
| WO | WO 2014/182587 | 11/2014 |
| WO | WO 2014/185400 | 11/2014 |
| WO | WO 2014/185954 | 11/2014 |

OTHER PUBLICATIONS

European Search Report dated Apr. 15, 2016 issued in counterpart application No. 15196296.6-1854, 8 pages.
European Search Report dated Apr. 17, 2018 issued in counterpart application No. 15196296.6-1214, 7 pages.
Chinese Office Action dated Sep. 23, 2019 issued in counterpart application No. 201580057442.2, 21 pages.

* cited by examiner

NAN Device 1 (701)

Available Active DW Bitmap

| DW 0 | DW 1 | DW 2 | DW 3 | DW 4 | DW 5 | DW 6 | DW 7 | DW 8 | DW 9 | DW 10 | DW 11 | DW 12 | DW 13 | DW 14 | DW 15 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |

NAN Device 2 (702)

Available Active DW Bitmap

| DW 0 | DW 1 | DW 2 | DW 3 | DW 4 | DW 5 | DW 6 | DW 7 | DW 8 | DW 9 | DW 10 | DW 11 | DW 12 | DW 13 | DW 14 | DW 15 |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 |

NAN Device 3 (703)

Available Active DW Bitmap

| DW 0 | DW 1 | DW 2 | DW 3 | DW 4 | DW 5 | DW 6 | DW 7 | DW 8 | DW 9 | DW 10 | DW 11 | DW 12 | DW 13 | DW 14 | DW 15 |
|---|---|---|---|---|---|---|---|---|---|---|---|---|---|---|---|
| 1 | 0 | 0 | 0 | 1 | 0 | 0 | 0 | 1 | 0 | 0 | 0 | 1 | 0 | 0 | 0 |

FIG.7

NAN Service Discovery Frame (800)

| Field | Size (Octets) | Value (Hex) | Description |
|---|---|---|---|
| 801 ∽ Category | 1 | 0x04 | IEEE 802.11 Public Action Frame |
| 802 ∽ Action Field | 1 | 0x09 | IEEE 802.11 Public Action Frame Vendor Specific |
| 803 ∽ OUI | 3 | 0x50-6F-9A | WFA specific OUI |
| 804 ∽ OUI Type | 1 | 0x13 | Identifying the type and version of the NAN |
| 805 ∽ NAN Attributes | Variable | Variable | One or more NAN Attributes |

FIG.8

NAN Attribute General Format (900)

| Field | Size (Octets) | Value (Hex) | Description |
|---|---|---|---|
| 901 Attribute ID | 1 | Variable | Identifies the type of NAN attribute as defined in Table 5_4 |
| 902 Length | 2 | Variable | Length of the following fields in the attribute |
| 903 Attribute Body Field | Variable | Variable | NAN Attribute specific information fields |

FIG.9

NAN Attributes in NAN Beacon frames and NAN SDF (1000)

| Attribute ID | Description | NAN Beacons | | NAN SDF |
|---|---|---|---|---|
| | | Sync | Discovery | |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14-220 | Reserved | NA | NA | NA |
| 221 | Vendor Specific Attribute | YES/O | YES/O | YES/O |
| 222-255 | Reserved | NA | NA | NA |

FIG.10

Service Descriptor Attribute Format (1100)

| Field | Size (Octets) | Value (Hex) | Description |
|---|---|---|---|
| Attribute ID | 1 | 0x03 | Identifies the type of NAN attribute |
| Length | 2 | Variable | Length of the following fields in the attribute |
| Service ID | 6 | Variable | Mandatory field that contains the hash of the Service Name |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap as defined inTable 5_9 |
| Binding Bitmap | 0 or 2 | 0x0000 to0xFF FF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters, refer toFigure 5_3 |
| Service Response Filter Length | 0 or 1 | Variable | An optional field and present if a service response filter is used |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein |

1101 → Service ID row
1102 → Service Info row

FIG.11

DISCOVERY METHOD AND AN ELECTRONIC DEVICE THEREOF

PRIORITY

This application is a Continuation Application of, and claims priority under 35 U.S.C. § 120 to, U.S. patent application Ser. No. 15/648,927, which was filed in the U.S. Patent and Trademark Office on Jul. 13, 2017, which claims priority under 35 U.S.C. § 120 to U.S. patent application Ser. No. 14/950,893, which was filed in the U.S. Patent and Trademark Office on Nov. 24, 2015, issued as U.S. Pat. No. 9,749,940 on Aug. 29, 2017, and now issued as U.S. Pat. No. 9,749,940 on Aug. 29, 2017, and which claims priority under 35 U.S.C. § 119(a) to a Korean Patent Application filed on Nov. 25, 2014, in the Korean Intellectual Property Office and is assigned Ser. No. 10-2014-0165439, the entire disclosure of each of which is incorporated herein by reference.

BACKGROUND

1. Field of the Disclosure

The present disclosure relates generally to a discovery method, and an electronic device thereof, and more particularly, to a proximity network configuration method in which each of electronic devices constituting a cluster through a proximity network shares active duration information of a Discovery Window (DW) which is configured differently or changed, and can effectively transmit/receive a signal on a basis of the shared active duration information, and an electronic device thereof.

2. Description of the Related Art

There is ongoing development on various types of proximity communication services using a near field communication technique. For example, there is ongoing development on a proximity communication service which can configure a proximity network between neighboring electronic devices and can exchange data through the proximity network.

The proximity communication service may be a low power proximity communication service, for example, using a Bluetooth Low Energy (BLE) beacon or the like, and may use a Neighbor Awareness Networking (NAN) communication standard based on a Wireless Local Area Network (WLAN).

The proximity communication service is a service using a proximity network which changes dynamically. For example, in an NAN communication, a set of electronic devices constituting a proximity network may be called a cluster.

For an electronic device which intends to join a cluster, at least one electronic device in the cluster must transmit a signal for reporting the existence of the cluster, and the electronic device which intents to join the cluster must receive the signal.

A signal for discovering a cluster may be transmitted by all electronic devices in the cluster or may be transmitted by some electronic devices in the cluster. The electronic devices that transmit a signal for discovering a cluster may consume relatively more power than electronic devices that do not transmit a signal for discovering a cluster due to the transmission of the signal for discovering a cluster.

Even if some electronic devices transmit a signal for discovering a cluster, other electronic devices may not be able to receive the signal. For example, each electronic device in a cluster may configure an active duration capable of transmitting/receiving a signal for discovering a cluster differently to decrease power consumption.

In an NAN communication, an active duration capable of transmitting/receiving a signal for discovering a cluster may be called a Discovery Window (DW). For example, even if some electronic devices transmit the signal for discovering a cluster, another electronic device may not receive the signal transmitted by some of the electronic devices if it is not a duration in which a DW of the other electronic device is active.

SUMMARY

An aspect of the present disclosure provides a proximity network configuration method in which each electronic device constituting a cluster through a proximity network shares active duration information of a DW which is configured differently or changed, and can effectively transmit/receive a signal on a basis of the shared active duration information, and an electronic device thereof.

According to an aspect of the present disclosure, a portable electronic device operable in a wireless local area network is provided. The portable electronic device includes communication circuitry to support a neighbor awareness networking in relation with the wireless local area network; and a processor configured to detect, using the communication circuitry, an electronic device external to the portable electronic device; transmit, using the communication circuitry, information to the electronic device, wherein the information includes a plurality of bits indicating an interval between a plurality of discovery windows in which the portable electronic device is to be operated in a wake-up state with respect to the neighbor awareness networking; adjust the interval based at least in part on a power state with respect to the portable electronic device; and transmit another information indicating the adjusted interval to the electronic device.

According to another aspect of the present disclosure, a portable electronic device operable in a wireless local area network is provided. The portable electronic device includes communication circuitry; and a processor configured to detect, using the communication circuitry, an electronic device external to the portable electronic device in the wireless local area network; transmit, using the communication circuitry, a signal indicating a plurality of discovery windows spaced at a first interval; adjust the first interval to a second interval based at least in part on a power state with respect to the portable electronic device; and transmit another signal indicating another plurality of discovery windows spaced at the second interval.

According to another aspect of the present disclosure, a non-transitory machine-readable storage device is provided. The non-transitory machine-readable storage device stores instructions that, when executed by one or more processors, cause the one or more processors to perform operations including detecting, at a portable electronic device, via a wireless communication, an electronic device external to the portable electronic device in a wireless local area network; transmitting, via the wireless communication, information to the electronic device, wherein the information includes a plurality of bits indicating an interval between a plurality of discovery windows in which the portable electronic device is to be operated in a wake-up state with respect to the wireless communication; adjusting the interval based at least in part on a power state with respect to the portable electronic device; and transmitting another information indicating the adjusted interval to the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a chart of active duration information of discovery windows for three NAN devices according to an embodiment of the present disclosure;

FIG. 8 is a chart of an NAN service discovery frame according to an embodiment of the present disclosure;

FIG. 9 is a chart of an NAN attribute general format according to an embodiment of the present disclosure;

FIG. 10 is a chart of an NAN attribute format in an NAN beacon frame and an NAN service discovery frame according to an embodiment of the present disclosure;

FIG. 11 is a chart of a service descriptor attribute format according to an embodiment of the present disclosure;

DETAILED DESCRIPTION OF EMBODIMENTS OF THE PRESENT DISCLOSURE

Hereinafter, various embodiments of the present disclosure are described with reference to the accompanying drawings. The various embodiments of the present disclosure may be changed in various forms, and are not limited to a certain embodiment described in detail hereinafter, as will be apparent to those ordinarily skilled in the art.

Figure 1:
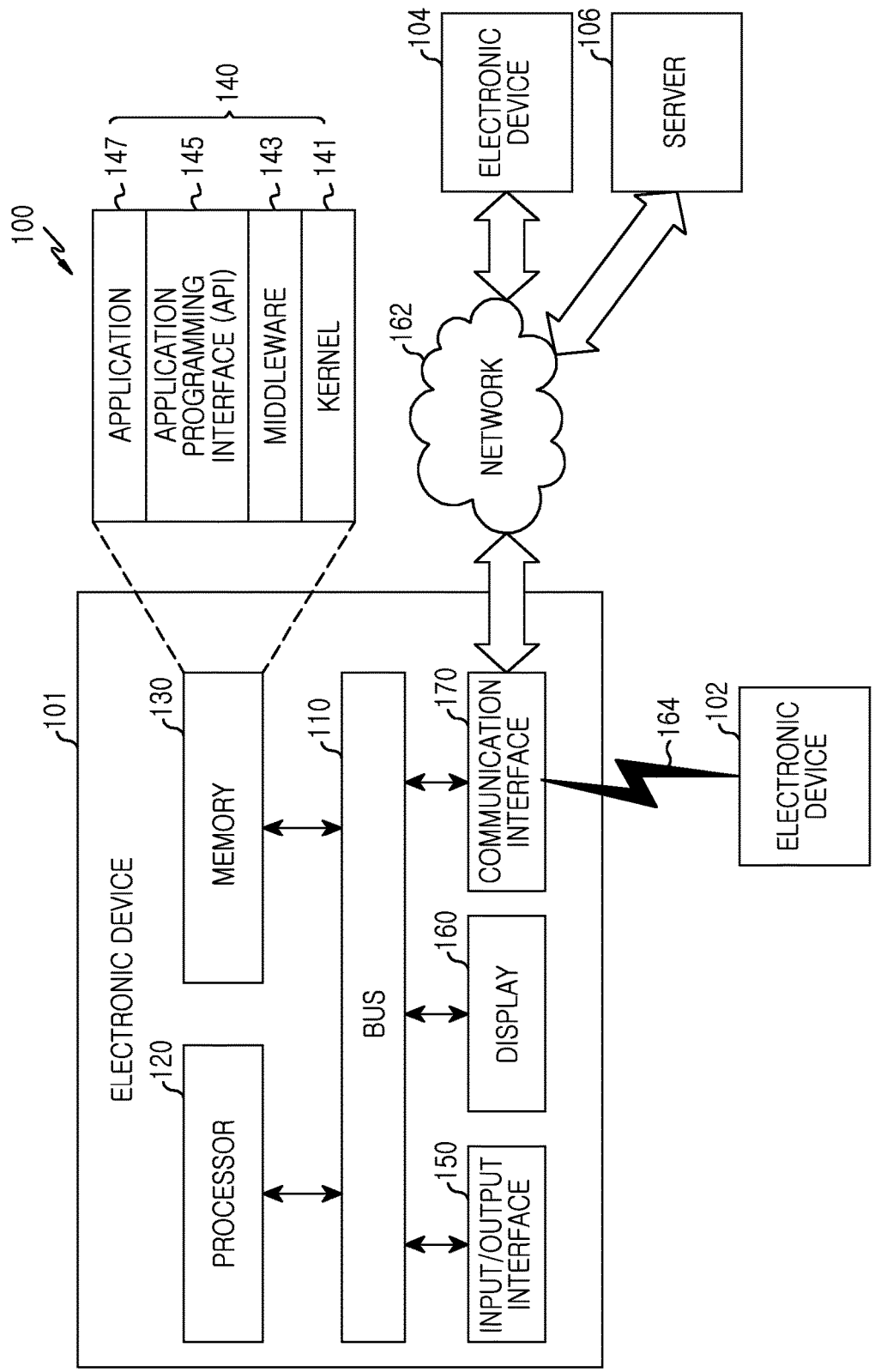
FIG. 1 is a block diagram of a network environment of an electronic device according to an embodiment of the present disclosure.

FIG. 1 is a block diagram of a network environment 100 of an electronic device 101 according to an embodiment of the present disclosure.

Referring to FIG. 1, the network environment 100 of the electronic device 101 may include various types of the electronic device 101 such as a smart phone, a tablet Personal Computer (PC), or the like, and may include an external electronic device 102 which communicates with the electronic device 101 in a near distance, an external electronic device 104 and a server 106 which communicate in a far distance via a network 162.

The electronic device 101 may include, for example, a bus 110, a processor 120, a memory 130, an input/output interface 150, a display 160, a communication interface 170, or the like. The bus 110 may include a circuit for connecting the aforementioned elements and for delivering a communication message or data between the elements.

The processor 120 may include one or more of a Central Processing Unit (CPU), an Application Processor (AP), and a Communication Processor (CP), and may control at least one of the elements of the electronic device 101 or may execute an arithmetic operation or process data for communication.

The processor 120 may provide control to, for example, configure a proximity network, and exchange data through a communication duration synchronized with other electronic devices belonging to a cluster of the proximity network. Herein, a communication duration may be referred to as a Discovery Window (DW) according to an NAN communication standard.

The memory 130 may include, for example, a volatile and/or a non-volatile memory, may store an instruction or data related to at least one different element of the electronic device 101, and may store software and/or a program 140.

The program 140 may include, for example, a kernel 141, middleware 143, an Application Programming Interface (API) 145, an application program 147, or the like. At least one part of the kernel 141, the middleware 143, or the API 145 may be referred to as an Operating System (OS).

The kernel 141 may control or manage, for example, system resources (e.g., the bus 110, the processor 120, the memory 130, etc.) used to execute an operation or function implemented in other programs (e.g., the middleware 143, the API 145, or the application program 147).

The middleware 143 may perform a mediation role so that the API 145 or the application program 147 can communicate with the kernel 141 to exchange data.

The API 145 may include at least one interface or function for file control, window control, video processing, character control, and the like, as an interface capable of controlling a function provided by the application 147 in the kernel 141 or the middleware 143.

The input/output interface 150 may play a role of an interface capable of delivering, for example, an instruction or data input from a user or a different external electronic device, to the different elements of the electronic device 101.

The display 160 may be various types of a display, for example, a Liquid Crystal Display (LCD), a Light Emitting Diode (LED) display, an Organic Light-Emitting Diode (OLED) display, or the like, may include a touch screen, and may receive a touch, gesture, proximity, or hovering input by using an electronic pen or a part of a user's body.

The communication interface 170 may establish a communication between the electronic device 101, the external electronic devices 102 and 104, and the server 106. For example, the communication interface 170 may communicate with the external electronic device 104 and the server 106 by being connected with the network 162 through wireless communication or wired communication.

The wireless communication may include, for example, at least one of Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), or the like. The wired communication may include, for example, at least one of a Universal Serial Bus (USB), a High Definition Multimedia Interface (HDMI), a Recommended Standard (RS)-232, and a Plain Old Telephone Service (POTS).

The network 162 may include, for example, at least one of a telecommunications network, a computer network (e.g., a Local Area Network (LAN) or a Wide Area Network (WAN)), an interne, and a telephone network.

Figure 2:
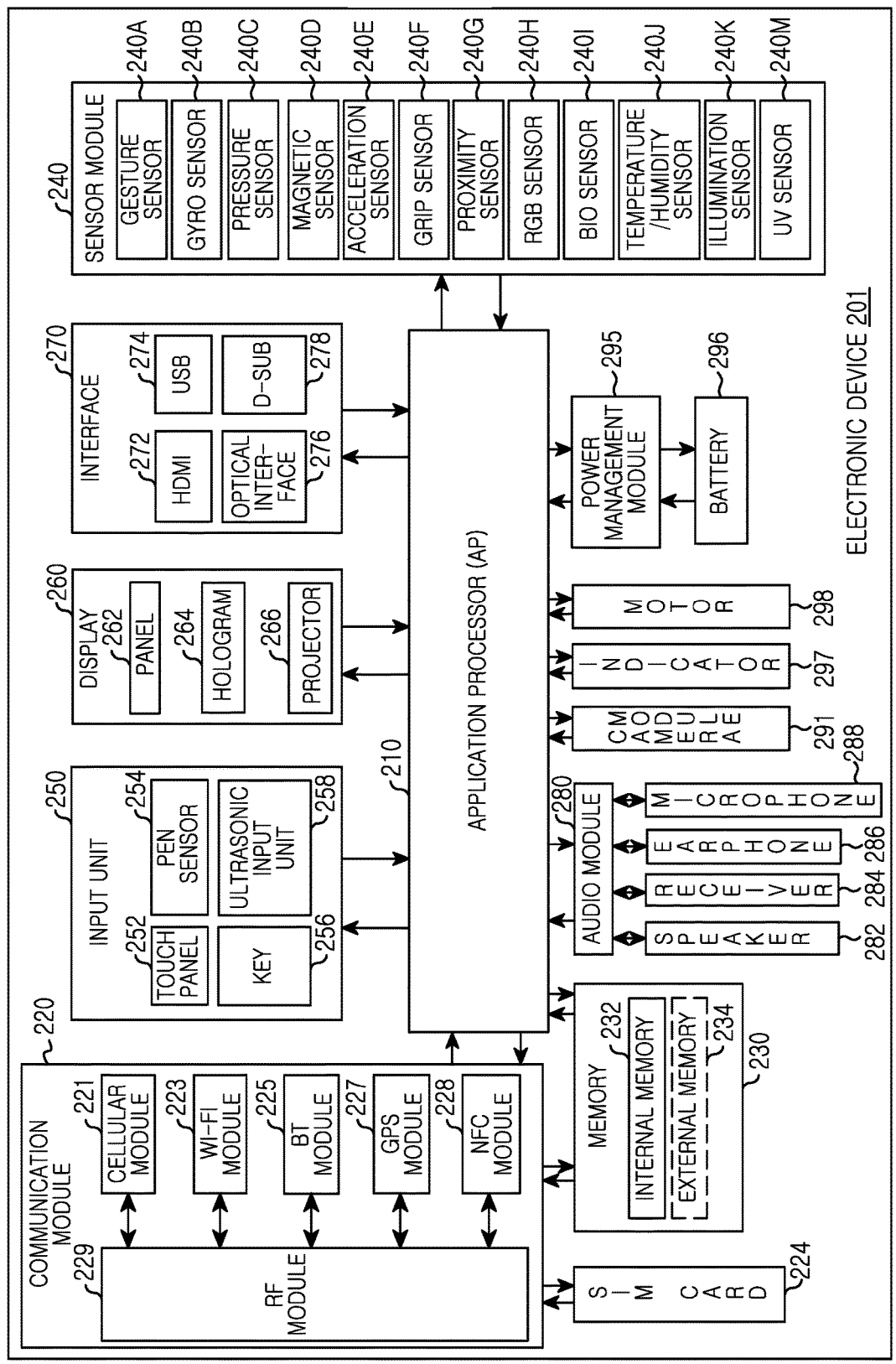
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, at least one Application Processor (AP) 210, a communication module 220, a Subscriber Identification Module (SIM) card 224, a memory 230, a sensor module 240, an input unit 250, a display 260, an interface 270, an audio module 280, a camera module 291, a power management module 295, a battery 296, an indicator 297, a motor 298, or the like.

The AP 210 may control a plurality of hardware or software elements connected to the AP 210 by driving, for example, an operating system or an application program, and may process a variety of data including multimedia data and may perform an arithmetic operation. The AP 210 may be implemented, for example, with a System on Chip (SoC), and may further include a Graphics Processing Unit (GPU) and/or an image signal processor.

The AP 210 may include at least one part (e.g., the cellular module 221) of the aforementioned elements of FIG. 2, and may process an instruction or data, which is received from at least one of different elements (e.g., a non-volatile memory), by loading it to a volatile memory and may store a variety of data in the non-volatile memory.

The communication module 220 may have the same or similar configuration of the communication interface 160 of FIG. 1. The communication module 220 may include a cellular module 221, a Wireless Fidelity (Wi-Fi) module 223, a BlueTooth (BT) module 225, a Global Positioning System (GPS) module 227, a Near Field Communication (NFC) module 228, and a Radio Frequency (RF) module 229.

The cellular module 221 may provide a voice call, a video call, a text service, an internet service, and the like, for example, through a communication network. The cellular module 221 may identify and authenticate the electronic device 201 within the communication network by using the SIM card 224. The cellular module 221 may perform at least some functions that can be provided by the AP 210, and may include a Communication Processor (CP).

Each of the Wi-Fi module 223, the BT module 225, the GPS module 227, and the NFC module 228 may include, for example, a processor for processing data transmitted/received through a corresponding module. At least some (e.g., two or more) of the cellular module 221, the Wi-Fi module 223, the BT module 225, the GPS module 227, and the NFC module 228 may be included in one Integrated Circuit (IC) or IC package.

The RF module 229 may transmit/receive, for example, an RF signal, and may include a transceiver, a Power Amplifier Module (PAM), a frequency filter, a Low Noise Amplifier (LNA), an antenna, or the like. At least one of the cellular module 221, the Wi-Fi module 223, the BT module 225, the GPS module 227, and the NFC module 228 may transmit/receive an RF signal via a separate RF module.

The SIM card 224 may include a SIM and/or an embedded SIM, and may include unique identification information (e.g., an Integrated Circuit Card IDentifier (ICCID)) or subscriber information (e.g., an International Mobile Subscriber Identity (IMSI)).

The memory 230 may include, for example, an internal memory 232 or an external memory 234. The sensor module 240 may measure, for example, a physical quantity or detect an operational state of the electronic device 201, and thus may convert the measured or detected information into an electrical signal.

The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) light sensor 240M.

The sensor module 240 may include, for example, an Electronic-nose (E-nose) sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor, and the like.

The input unit 250 may include, for example, a touch panel 252, a (digital) pen sensor 254, a key 256, or an ultrasonic input unit 258. The display 260 may include a panel 262, a hologram 264, or a projector 266.

The interface 270 may include, for example, an HDMI 272, a USB 274, an optical communication interface 276, or a D-subminiature (D-sub) connector 278. The audio module 280 may bilaterally convert, for example, a sound and electronic signal, and may convert sound information which is input or output, for example, through a speaker 282, a receiver 284, an earphone 286, the microphone 288, and the like.

The camera module 291 is a device, for example, for image and video capturing, and may include one or more image sensors (e.g., a front sensor or a rear sensor), a lens, an Image Signal Processor (ISP), or a flash (e.g., LED or xenon lamp).

The power management module 295 may manage power of, for example, the electronic device 201, and may include a Power Management Integrated Circuit (PMIC), a charger Integrated Circuit (IC), or a battery gauge.

The indicator 297 may indicate a certain state, for example, a booting state, a message state, a charging state, and the like, of the electronic device 201 or a part thereof (e.g., the AP 210). The motor 298 may convert an electrical signal into a mechanical vibration, and may generate an effect such as a vibration or the like.

Figure 3:
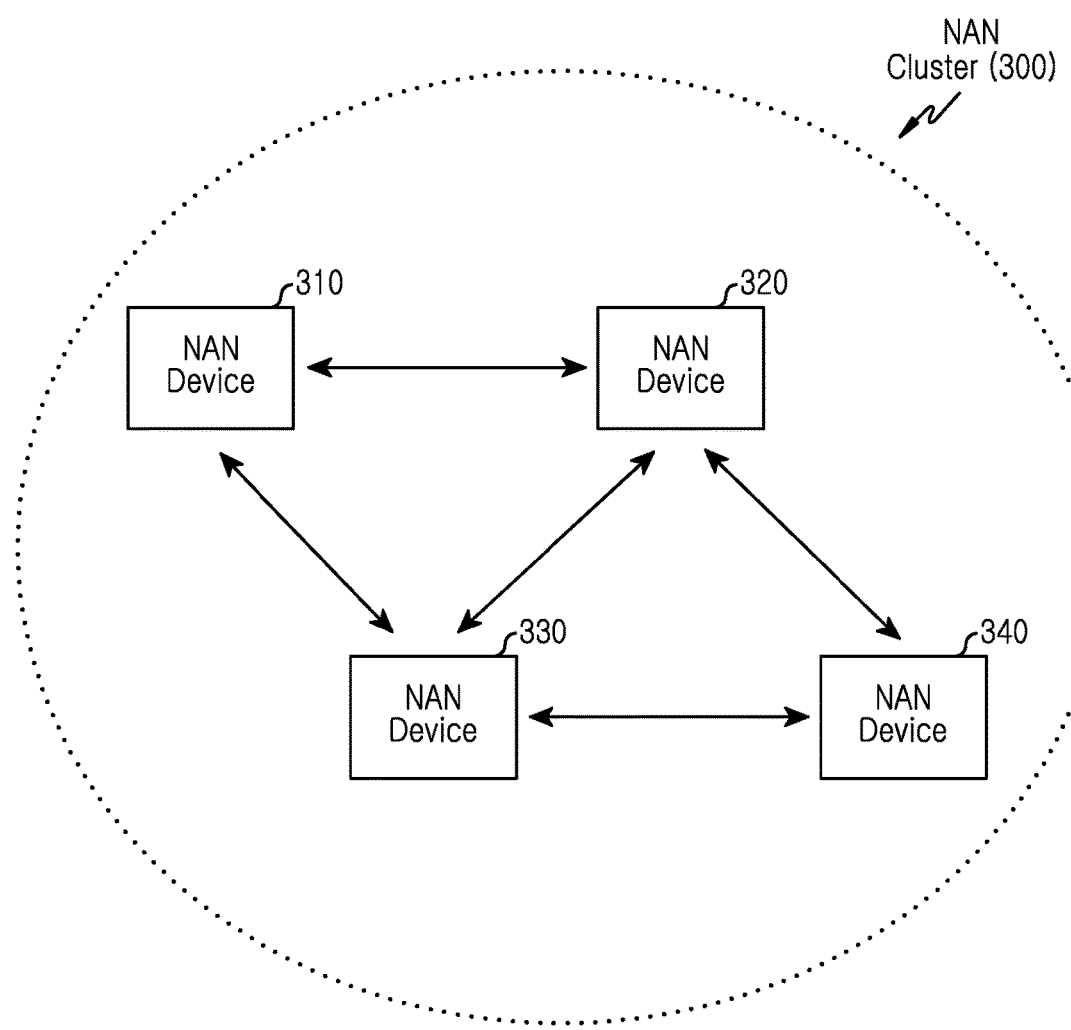
FIG. 3 is a block diagram of a cluster according to an embodiment of the present disclosure.

FIG. 3 is a block diagram of a cluster 300 according to an embodiment of the present disclosure.

Referring to FIG. 3, the cluster 300 indicates a set of electronic devices which constitute a proximity network so that each electronic device can mutually transmit and receive data.

The cluster 300 may be called an NAN cluster according to an NAN communication standard. The cluster 300 may be constructed of, for example, a plurality of electronic devices 310, 320, 330, and 340. Each of the electronic devices in the cluster 300 may perform discovery, synchronization, and data exchange operations by using, for example, a beacon, a synchronization beacon, a service discovery frame, or the like.

Figure 4:
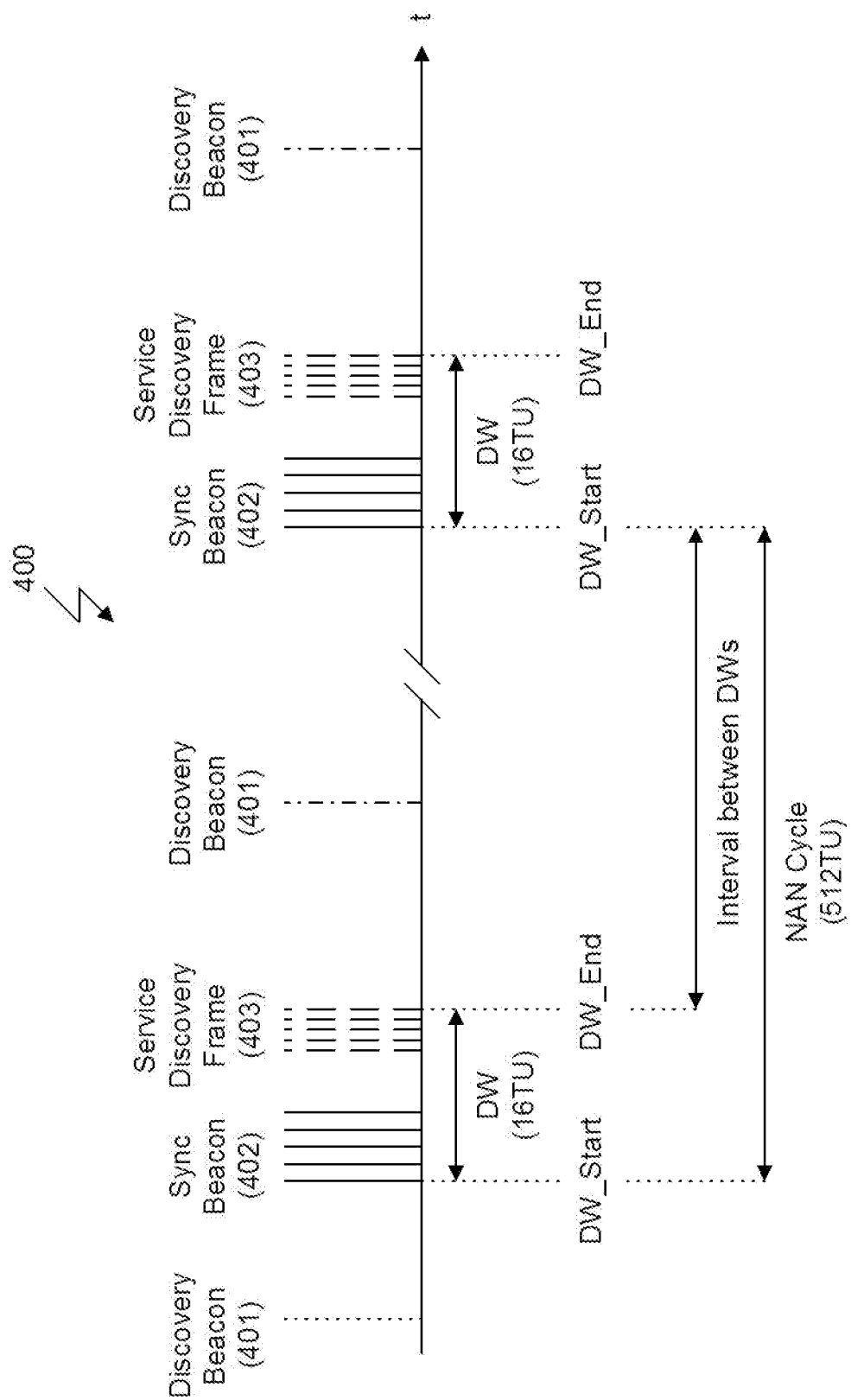
FIG. 4 is a diagram of an NAN discovery window according to an embodiment of the present disclosure.

FIG. 4 is a diagram of an NAN discovery window according to an embodiment of the present disclosure.

Referring to FIG. 4, electronic devices included in a cluster may transmit a signal through a certain channel (e.g., channel 6) according to an NAN communication standard.

The electronic devices may transmit a synchronization beacon 402 and a service discovery frame 403 in a certain DW duration defined in an NAN communication standard, and may transmit a discovery beacon 401 in a duration other than the certain DW duration.

The synchronization beacon 402 and the service discovery frame 403 may be transmitted in a contention-based manner between the respective electronic devices belonging to a cluster. The DW is a duration in which a corresponding electronic device is activated from a low-power or sleep state to a full-power or wake-up state for data exchange between the respective electronic devices.

The DW may be divided into Time Units (TUs), for example, millisecond units. The DW for transmitting/receiving the synchronization beacon 402 and the service discovery frame 403 may occupy, for example, 16 TUs according to an NAN communication standard, and may have a cycle that repeats every 512 TUs (i.e., 512 T).

The discovery beacon 401 is a signal transmitted to allow an electronic device, which has not joined a cluster, to discover the cluster. That is, the discovery beacon 401 is a signal for reporting the existence of a cluster, and electronic devices can join the cluster by performing a passive scan to receive the discovery beacon 401.

The discovery beacon 401 may include information necessary for synchronizing with a cluster. For example, the discovery beacon may include at least one of a Frame Control (FC) field for indicating a signal's function (e.g., a beacon), a broadcast address, a Media Access Control (MAC) address of a transmitting device, a cluster identifier, a sequence control, a time stamp for a beacon frame, a beacon interval for indicating a transmission interval of the discovery beacon, and capability information of the transmitting device.

The discovery beacon 401 may include at least one proximity network (or cluster) related information element. The proximity network related information may be referred to as attribute information.

The synchronization beacon 402 is a signal for maintaining synchronization between respective electronic devices belonging to a cluster. The synchronization beacon 402 may include necessary information for synchronizing with a cluster.

For example, the synchronization beacon 402 may include at least one of an FC field for indicating a signal's function (e.g., a beacon), a broadcast address, a MAC address of a transmitting device, a cluster identifier, a sequence control, a time stamp for a beacon frame, a beacon interval for indicating a transmission interval of a discovery beacon, and capability information of a transmitting device. The synchronization beacon 402 may include at least one piece of proximity network related information.

The service discovery frame 403 is a signal for exchanging data through a proximity network. Proximity network related information may include contents for a proximity network service. The service discovery frame 403 is a vendor specific public action frame, and may include various fields.

For example, the service discovery frame 403 may include category and action fields, and may include at least one piece of proximity network related information.

The discovery beacon 401 may include proximity network related information. The proximity network related information may include an identifier indicating an information type, an information length, and a body field as corresponding information.

For example, corresponding information may include at least one of master indication information, cluster information, service identifier list information, service descriptor information, connection capability information, WLAN infrastructure information, Peer To Peer (P2P) operation information, Independent Basic Service Set (IBSS) information, mesh information, further proximity network service discovery information, further availability map information, country code information, ranging information, cluster discovery information, and vendor specific information.

Figure 5:
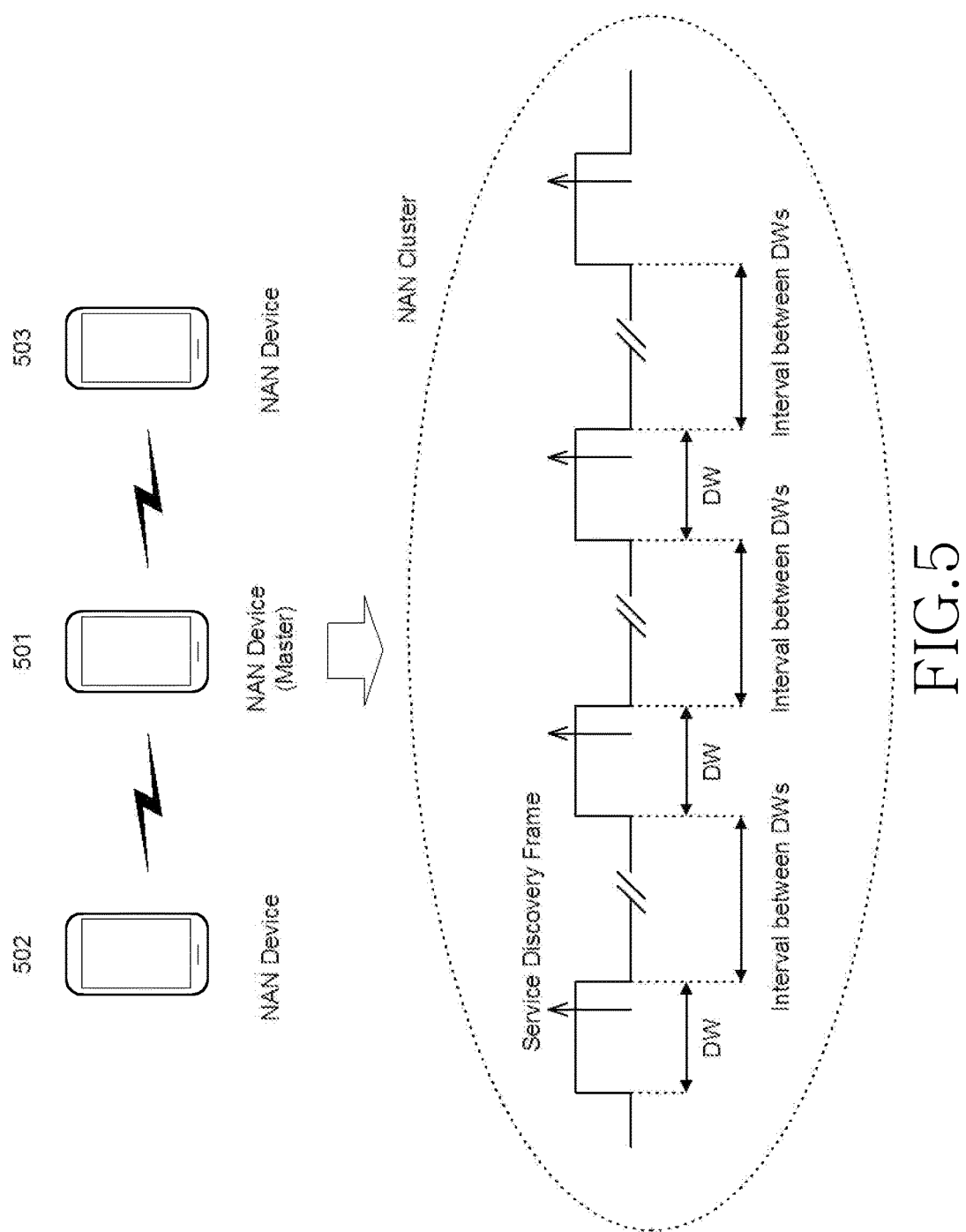
FIG. 5 is a diagram of data exchange in a cluster according to an embodiment of the present disclosure.

FIG. 5 is a diagram of data exchange in a cluster according to an embodiment of the present disclosure.

Referring to FIG. 5, at least one electronic device 501 in an NAN cluster may play a role of a master electronic device.

The electronic device 501 may transmit a Service Discovery Frame (SDF) in a DW duration, for example, according to an NAN communication standard, and other electronic devices 502 and 503 in the NAN cluster may receive the SDF.

In a duration other than the DW duration, the electronic devices 501, 502, and 503 maintain a sleep state as a power saving mode to reduce power consumption. For example, since the electronic devices operate in a wake-up state by transitioning from the sleep state only in a DW active duration according to a time clock, power consumption can be reduced.

Figure 6:
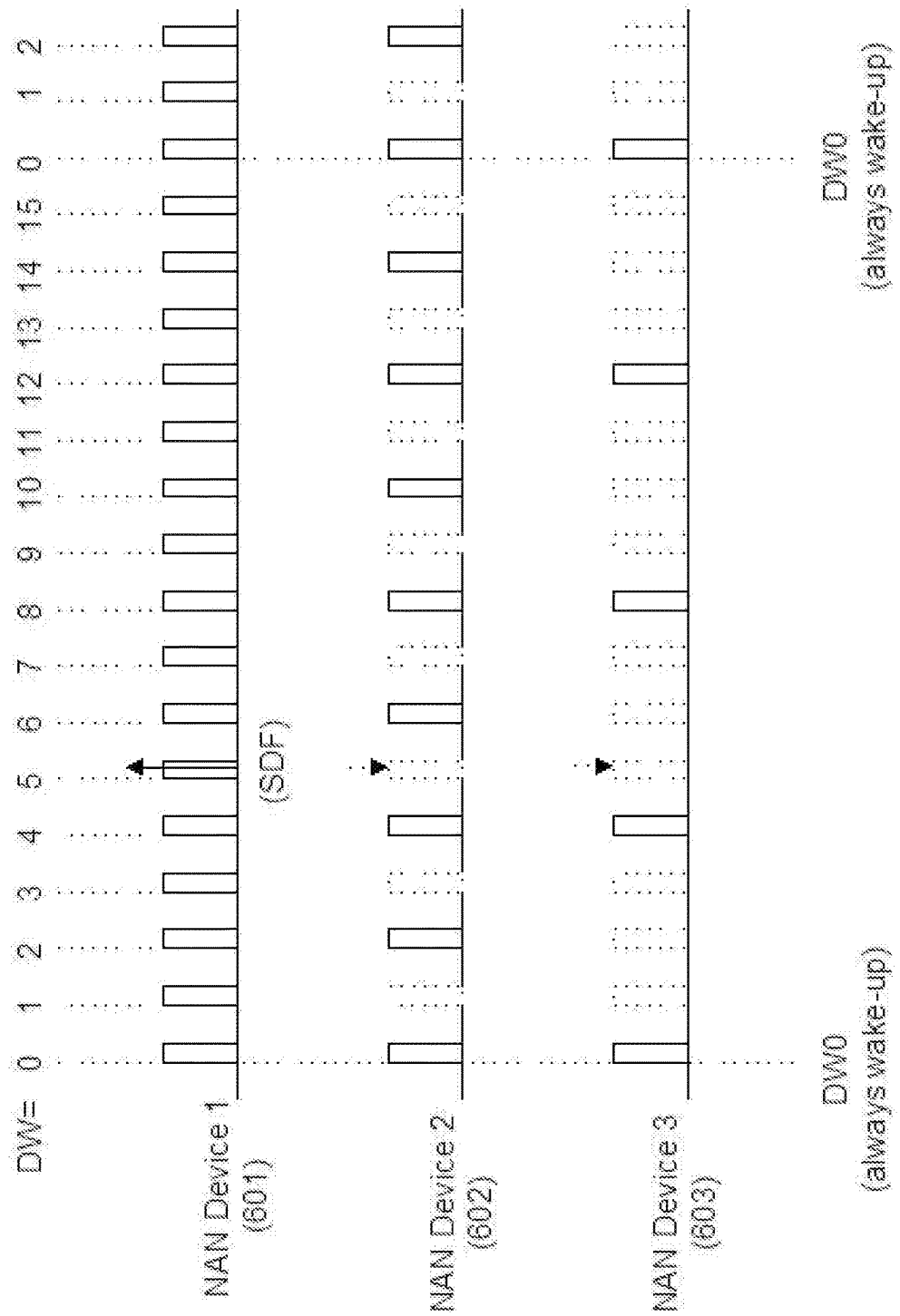
FIG. 6 is a diagram of a discovery operation between respective electronic devices according to an embodiment of the present disclosure.

FIG. 6 is a diagram of a discovery operation between respective electronic devices according to an embodiment of the present disclosure.

Referring to FIG. 6, for example, $1^{st}$ to $3^{rd}$ electronic devices 601, 602, and 603 belonging to one cluster may configure different DW active durations according to a power state, operation state, or the like of each electronic device.

The $1^{st}$ electronic device 601 may configure 16 DW active durations DW0-15 in which a signal can be transmitted/received with an interval of 1×512 TUs during 16 DW TUs according to an NAN communication standard.

The $2^{nd}$ electronic device 602 may configure 8 DW active durations DW0, 2, 4, 6, 8, 10, 12, and 14 in which a signal can be transmitted/received with an interval of 2×512 TUs during the 16 DW TUs.

The $3^{rd}$ electronic device 603 may configure 4 DW active durations DW0, 4, 8, and 12 in which a signal can be transmitted/received with an interval of 4×512 TUs during the 16 DW TUs.

According to an NAN communication standard, among the 16 DWs, the $1^{st}$ DW, i.e., DW0, is specified such that all electronic devices must be in a wake-up state, and thus synchronization can be continuously maintained between the electronic devices 601 to 603.

If the $1^{st}$ electronic device 601 transmits an SDF or the like, for example, in the DW5, in a broadcasting or unicasting manner, as shown in FIG. 6, the $2^{nd}$ electronic device 602 and the $3^{rd}$ electronic device 603 are not in a DW active duration but in a sleep state, and thus cannot receive the SDF.

That is, if the $1^{st}$ to $3^{rd}$ electronic devices 601 to 603 do not share active duration information of a DW which may be configured differently or changed according to a power state or an operation state or the like of each electronic device, as described above with reference to FIG. 6, a signal transmission error may occur in which a signal transmitted by an electronic device cannot be received by another electronic device.

According to an embodiment of the present disclosure, DW active duration information configured in each electronic device is shared, and signals are transmitted/received in a proper duration in which other electronic devices can receive the signals on the basis of the shared active duration information. Therefore, a signal transmitted by one electronic device in a cluster can be received by another electronic device, thereby being able to increase certainty of signal transmission and to avoid unnecessary power consumption.

FIG. 7 illustrates an example of active duration information of a discovery window according to an embodiment of the present disclosure.

Referring to FIG. 7, the DW active duration information may be referred to variously as, for example, an Available Active Discovery Window (AADW) bitmap, or the like, and the AADW bitmap may be a bit-stream of 16 bits.

A value of 1 included in the AADW bitmap indicates a duration in which a DW is active, and a value of 0 included in the AADW bitmap indicates a duration in which the DW is not active.

For example, an AADW bitmap 701 of the $1^{st}$ electronic device 601 of FIG. 6 may have a bit-stream value of "1111111111111111," and this value indicates that the $1^{st}$ electronic device 601 is configured with 16 DW active durations DW0-15 in which a signal can be transmitted/received with an interval of 1×512 TUs during 16 DW TUs.

An AADW bitmap 702 of the $2^{nd}$ electronic device 602 may have a bit-stream value of "1010101010101010," and this value indicates that the electronic device 602 is configured with 8 DW active durations DW0, 2, 4, 6, 8, 10, 12, and 14 in which a signal can be transmitted/received with an interval of 2×512 TUs during 16 DW TUs.

An AADW bitmap 703 of the $3^{rd}$ electronic device 603 may have a bit-stream value of "1000100010001000," and this value indicates that the electronic device 603 is configured with 4 DW active durations DW0, 4, 8, and 12 in which a signal can be transmitted/received with an interval of 4×512 TUs during 16 DW TUs.

FIG. 8 is a chart of an NAN service discovery frame according to an embodiment of the present disclosure.

Referring to FIG. 8, an NAN service discovery frame 800 may include a category 801, an action field 802, an Organizationally Unique Identifier (OUI) 803, an OUI type 804, and an NAN attributes field 805 according to an NAN communication standard.

The NAN attributes field 805 may have an undetermined variable size and an undetermined variable value, and at least one piece of NAN attribute information may be recorded therein.

According to an embodiment of the present disclosure, an electronic device belonging to a cluster transmits an AADW bitmap as DW active duration information of the electronic device by including the AADW bitmap in an SDF, e.g., the NAN attributes field 805 or the like, and other electronic devices belonging to the cluster receive and share the AADW bitmap.

Further, the AADW bitmap may be transmitted by being included in a synchronization beacon or a discovery beacon, and thus can be shared by electronic devices. Hereinafter, an embodiment in which the AADW bitmap is included in the SDF is described below in detail. However, the present disclosure is not limited to an embodiment described hereinafter, as will be apparent to those ordinarily skilled in the art.

FIG. 9 illustrates an NAN attribute general format according to an embodiment of the present disclosure.

Referring to FIG. 9, an NAN attribute general format 900 may include an attribute IDentifier (ID) 901, a length 902, and an attribute body field 903 according to an NAN communication standard.

Each of the attribute ID 901 and the length 902 has a determined size (e.g., 1 octet and 2 octets, respectively) and an undetermined variable value. The attribute body field 903 has an undetermined variable size and variable value. In an embodiment of the present disclosure, an AADW bitmap may be transmitted to an electronic device by being included in the attribute body field 903.

FIG. 10 illustrates an NAN attribute format in an NAN beacon frame and an NAN service discovery frame according to an embodiment of the present disclosure.

Referring to FIG. 10, an NAN attribute format 1000 in an NAN beacon frame and an NAN service discovery frame may include a variety of several pieces of attribute information according to an NAN communication standard.

For example, as shown in FIG. 10, according to the NAN attribute format 1000, a service descriptor attribute 1001, a reserved area 1002, a vendor specific attribute 1003, or the like may be included, and an attribute ID which is unique for each piece of attribute information may be included.

According to an embodiment of the present disclosure, an AADW bitmap of a corresponding electronic device may be transmitted by being included in the reserved area 1002. In an embodiment of the present disclosure, the AADW bitmap of the corresponding electronic device may be transmitted by being included in the vendor specific attribute 1003, and a unique attribute ID for reporting that the AADW bitmap is included may be defined and transmitted to electronic devices in a cluster. Further, according to an embodiment of the present disclosure, the AADW bitmap of the corresponding electronic device may be transmitted by being included in the service descriptor attribute 1001.

FIG. 11 is a chart of a service descriptor attribute format according to an embodiment of the present disclosure.

Referring to FIG. 11, a service descriptor attribute format 1100 may include a variety of several pieces of information according to an NAN communication standard.

For example, as shown in FIG. 11, according to the service descriptor attribute format 1100, a service ID 1101, a service Information (or Info) service, or the like may be included. The service ID 1101 has a determined size (e.g., 6 octets) and an undetermined variable value, and the service information 1102 has an undetermined variable size and variable value.

According to an embodiment of the present disclosure, an AADW bitmap of a corresponding electronic device may be transmitted by being included in the service information 1102, and a new service ID 1101 for indicating that the AADW bitmap is included may be defined and transmitted to electronic devices in a cluster.

Figure 12:
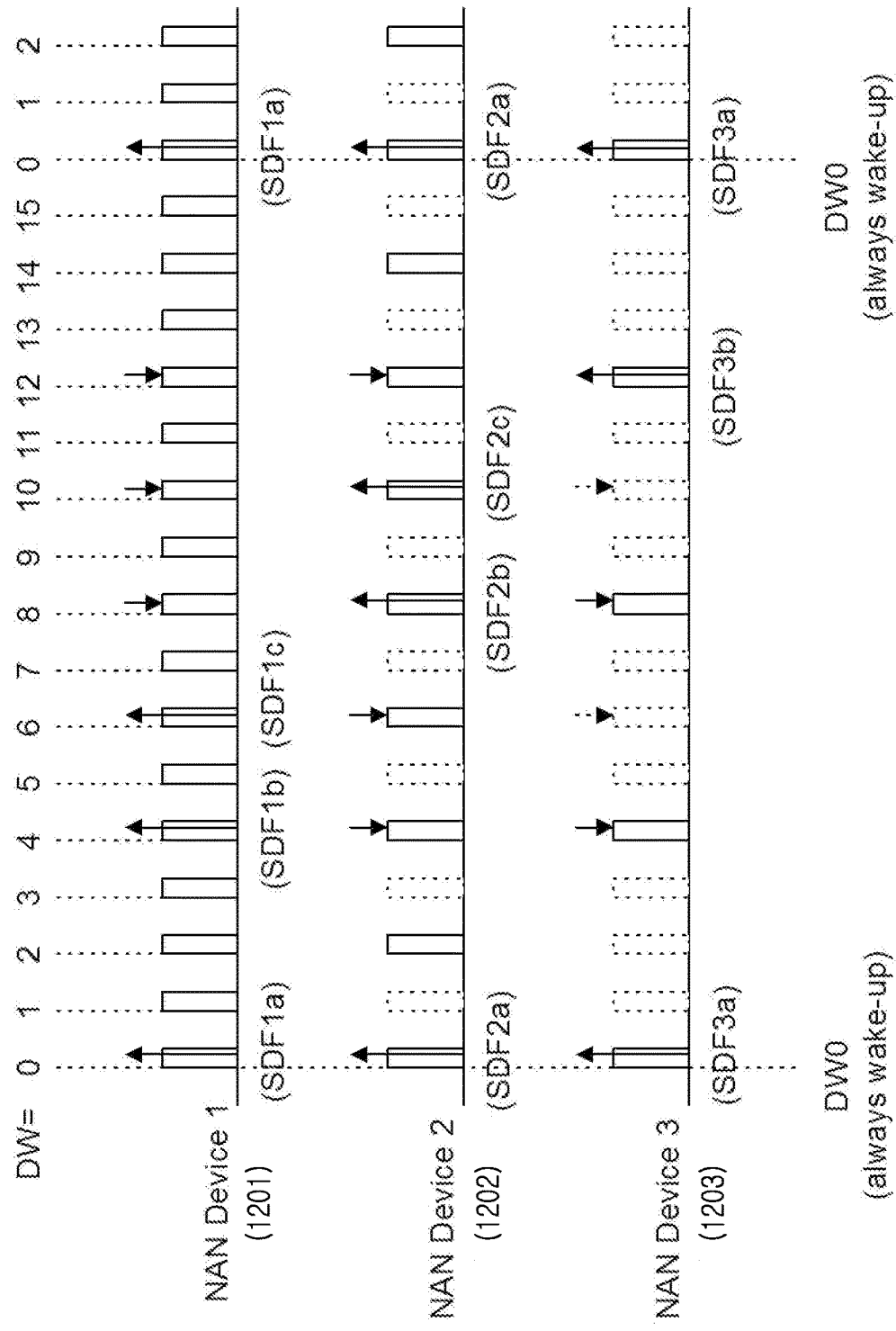
FIG. 12 is a chart of a discovery operation using an Available Active Discovery Window (AADW) bitmap according to an embodiment of the present disclosure.

FIG. 12 is a chart of a discovery operation using an AADW bitmap according to an embodiment of the present disclosure.

Referring to FIG. 12, for example, $1^{st}$ to $3^{rd}$ electronic devices 1201, 1202, and 1203 belonging to one cluster may configure different DW active durations according to a power state, operation state, or the like of each electronic device.

The $1^{st}$ electronic device 1201 may configure 16 DW active durations DW0-15 in which a signal can be transmitted/received with an interval of 1×512 TUs during 16 DW TUs according to an NAN communication standard.

The 2$^{nd}$ electronic device 1202 may configure 8 DW active durations DW0, 2, 4, 6, 8, 10, 12, and 14 in which a signal can be transmitted/received with an interval of 2×512 TUs during the 16 DW TUs.

The 3$^{rd}$ electronic device 1203 may configure 4 DW active duration DW0, 4, 8, and 12 in which a signal can be transmitted/received with an interval of 4×512 TUs during the 16 DW TUs.

According to an NAN communication standard, among the 16 DWs, the 1$^{st}$ DW, i.e., DW0, is specified such that all electronic devices must be in a wake-up state, and thus synchronization can be continuously maintained between the electronic devices 1201 to 1203.

In an embodiment of the present disclosure, in the DW0 in which all electronic devices are in the wakeup state as described above, an AADW bitmap configured in each electronic device may be transmitted by being included in an SDF, and even if the AADW bitmap configured in each electronic device is changed, the AADW bitmap may be transmitted by being included in the SDF. Accordingly, all of the electronic devices can share mutual AADW bitmaps.

Each of the electronic devices can transmit a signal to another electronic device by transmitting at least one of a synchronization beacon, a discovery beacon, and an SDF in a broadcast or unicast manner on the basis of the shared AADW bitmaps of the other electronic devices.

Referring to FIG. 12, since the 1$^{st}$ to 3$^{rd}$ electronic devices 1201, 1202, and 1203 share the mutual AADW bitmaps, if the 1$^{st}$ electronic device 1201 transmits an SDF1*b* in the DW4 of FIG. 12, both the 2$^{nd}$ electronic device 1202 and the 3$^{rd}$ electronic device 1203 can receive the SDF1*b*. In this case, the SDF1*b* is transmitted in a broadcast manner.

If the 1$^{st}$ electronic device 1201 transmits an SDF1*c* in the DW6 of FIG. 12, only the 2$^{nd}$ electronic device 1202 can receive the SDF1*c*. In this case, the SDF is transmitted in a unicast manner.

If the 2$^{nd}$ electronic device 1202 transmits an SDF2*b* in the DW8 of FIG. 12, both the 1$^{st}$ electronic device 1201 and the 3$^{rd}$ electronic device 1203 can receive the SDF2*b*. In this case, the SDF1*b* is transmitted in a broadcast manner.

If the 2$^{nd}$ electronic device 1202 transmits an SDF2*c* in the DW10 of FIG. 12, only the 1$^{st}$ electronic device 1201 can receive the SDF2*c*. In this case, eventually, the SDF2*c* is transmitted in a unicast manner.

If the 3$^{rd}$ electronic device 1203 transmits an SDF3*b* in the DW12 of FIG. 12, both the 1$^{st}$ electronic device 1201 and the 2$^{nd}$ electronic device 1202 can receive the SDF3*b*. In this case, the SDF3*b* is transmitted in a broadcast manner.

According to an embodiment of the present disclosure, an electronic device may include a communication module for communicating with an electronic device through a proximity network, and a processor for controlling the communication module. The processor may control the communication module to configure a cluster with an electronic device through a proximity network, to acquire active duration information of a discovery window for the electronic device, and to communicate with the electronic device on the basis of the active duration information.

The proximity network may be a near field communication network to which an NAN communication standard is applied. The active duration information of the discovery window may be an Available Active Discovery Window (AADW) bitmap. The active duration information of the discovery window may be transmitted by being included in a service discovery frame of an NAN communication standard applied to the proximity network.

The active duration information of the discovery window may be transmitted by being included in a reserved area of an NAN attributes field of the service discovery frame. The active duration information of the discovery window may be transmitted by being included in a vendor specific attribute area of an NAN attributes field of the service discovery frame. The active duration information of the discovery window may be transmitted by being included in a service descriptor attribute area of an NAN attributes field of the service discovery frame.

The service descriptor attribute area may include a service IDentifier (ID) field and a service Info field. The service ID field may include a service ID for the active duration information of the discovery window. The service information field may include the active duration information of the discovery window.

If the active duration information of the discovery window of an electronic device is changed while communicating with another electronic device, a processor may control a communication module to transmit the changed active duration information of the discovery window to the other electronic device. The active duration information of the discovery window of the electronic device may be changed by at least one of a change in a power state and a change in an operation state of the electronic device.

If the changed active duration information of the discovery window of an electronic device is acquired while another electronic device is communicating with the electronic device, a processor may control a communication module to change the active duration information of the discovery window of the other electronic device in accordance with the acquired active duration information.

Figure 13:
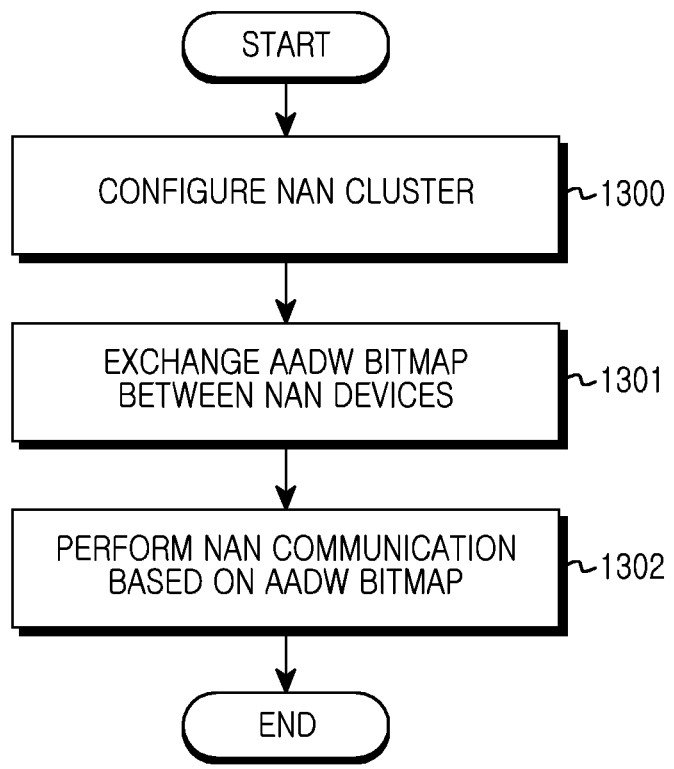
FIG. 13 is a flowchart of an NAN communication method according to an embodiment of the present disclosure.

FIG. 13 is a flowchart of an NAN communication method according to an embodiment of the present disclosure.

Referring to FIG. 13, in step 1300, a plurality of neighboring electronic devices may be configured as one cluster as a proximity network according to an NAN communication standard.

In step 1301, the plurality of electronic devices in the cluster transmit to other electronic devices an AADW bitmap which is DW active duration information configured in each electronic device by including the AADW bitmap in an SDF. Therefore, the plurality of electronic devices can share mutual AADW bitmaps.

In step 1302, each of the electronic devices can perform accurate NAN communication in which at least one electronic device transmits a synchronization beacon, an SDF, or the like in a wakeup state, on the basis of the shared AADW bitmap of the other electronic devices.

Figure 14:
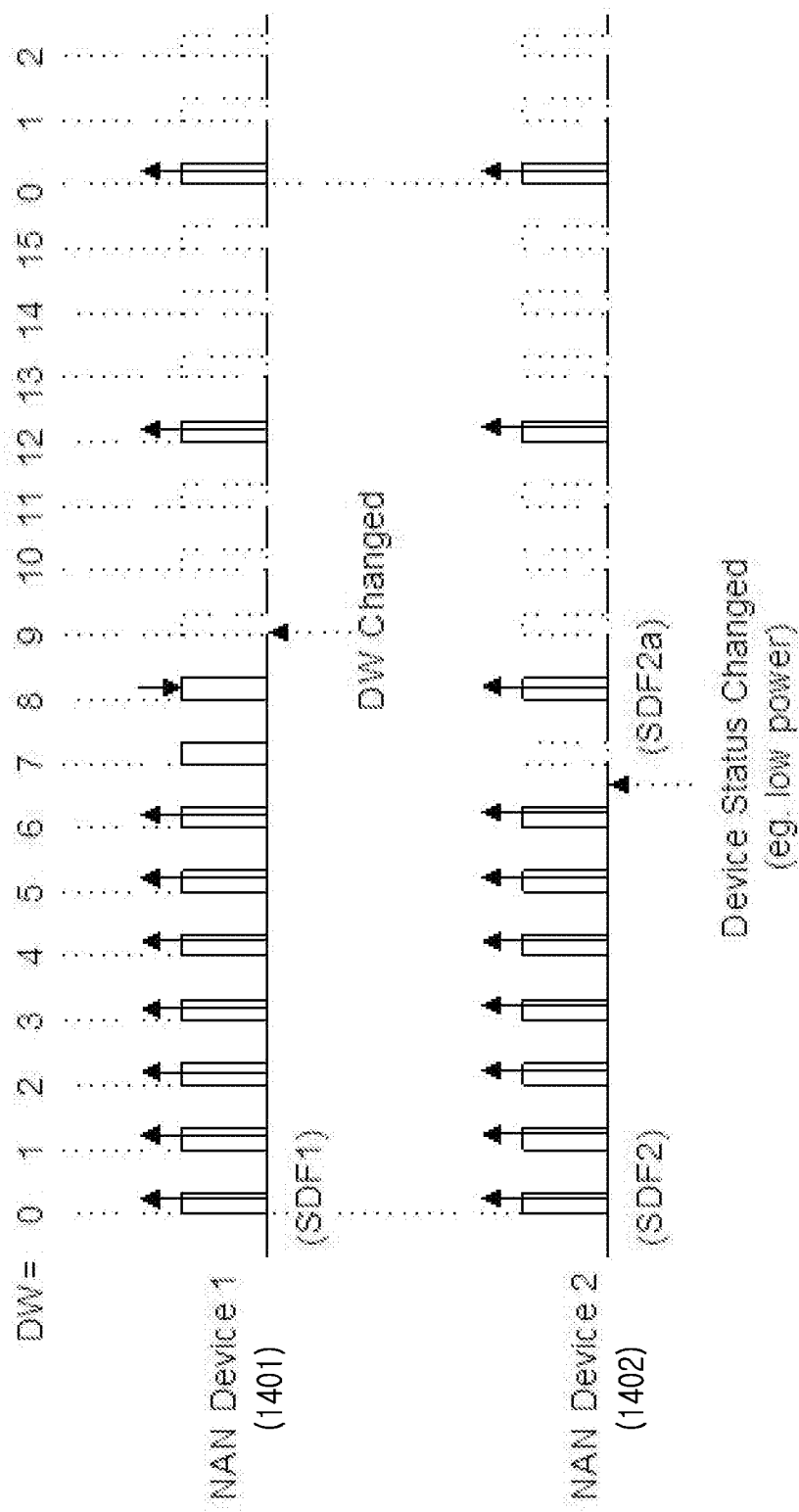
FIG. 14 is a chart of a discovery operation using a changed AADW bitmap according to an embodiment of the present disclosure.

FIG. 14 is a chart of a discovery operation using a changed AADW bitmap according to an embodiment of the present disclosure.

Referring to FIG. 14, for example, a 1$^{st}$ electronic device 1401 and a 2$^{nd}$ electronic device 1402 which belong to one cluster may randomly change a pre-set DW active duration according to a power state, an operation state, or the like of each electronic device.

Since the 1$^{st}$ electronic device 1401 and the 2$^{nd}$ electronic device 1402 share mutual AADW bitmaps, data can be exchanged by transmitting/receiving a service discovery frame (i.e., SDF1*b*) or the like in a DW0 to a DW6 in FIG. 14.

Thereafter, if the 2$^{nd}$ electronic device 1402 changes a pre-set AADW bitmap differently according to a low-power state, an operation state, or the like, the changed AADW bitmap may be transmitted in a DW8 by being included in a service discovery frame (i.e., SDF2*a*).

The 1st electronic device 1401 may extract the AADW bitmap included the service discovery frame (i.e., SDF2*a*) received in the DW8 and update it to the AADW bitmap of the 2nd electronic device 1402, and thereafter may perform an NAN communication with the 2nd electronic device 1402 according to the updated AADW bitmap.

Figure 15:
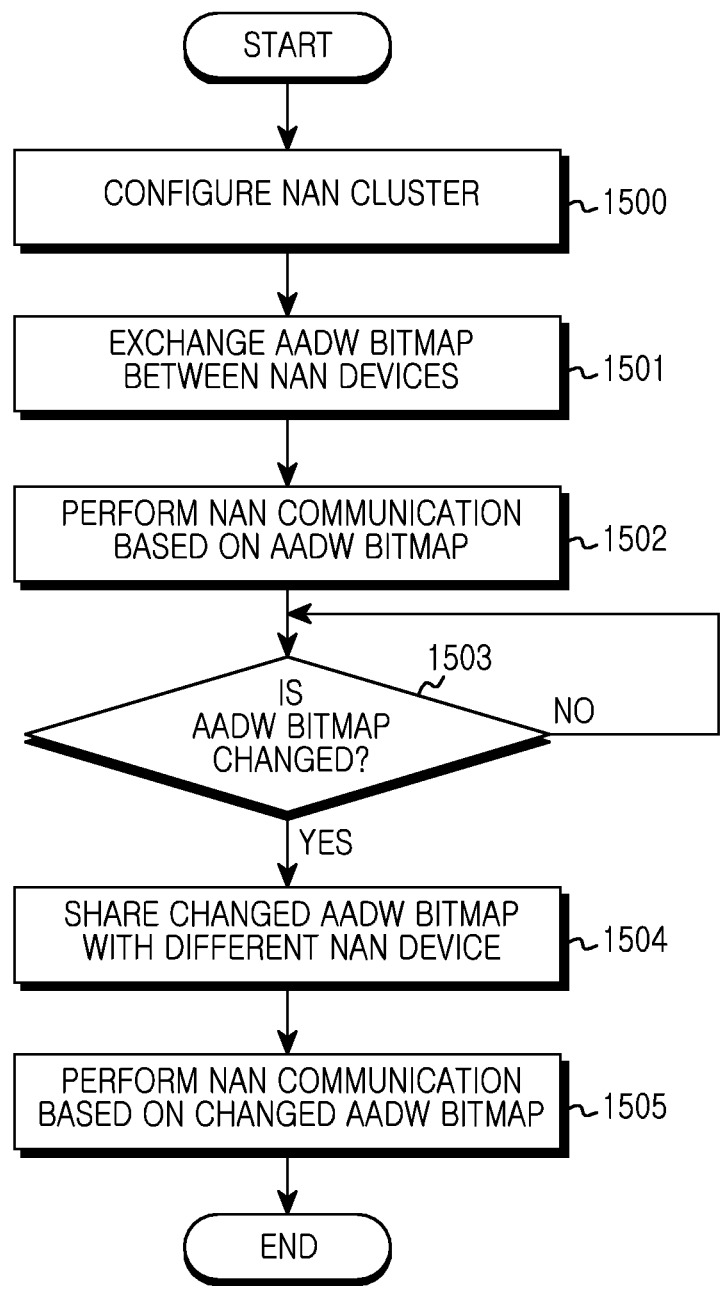
FIG. 15 is a flowchart of an NAN communication method according to an embodiment of the present disclosure.

FIG. 15 is a flowchart of an NAN communication method according to an embodiment of the present disclosure.

Referring to FIG. 15, in step 1500, a plurality of neighboring electronic devices may be configured into one cluster as a proximity network according to an NAN communication standard.

In step 1501, the plurality of electronic devices in the cluster transmit to other electronic devices an AADW bitmap which is DW active duration information configured in each electronic device by including the AADW bitmap into an SDF. Therefore, the plurality of electronic devices can share mutual AADW bitmaps.

In step 1502, each of the electronic devices can perform an NAN communication in which at least one electronic device transmits a synchronization beacon, an SDF, or the like in a wakeup state, on the basis of the shared AADW bitmap of the other electronic devices.

In step 1503, if at least one electronic device among the plurality of electronic devices changes an AAWD bitmap to be different from the previous one according to a power state, an operation state, or the like, in step 1504, the electronic device which has changed the AADW bitmap transmits the changed AADW bitmap to another electronic device by including the AADW bitmap into the SDF. Therefore, the plurality of electronic devices can update and share the changed AADW bitmaps.

In step 1505, each of the electronic devices can perform an NAN communication in which at least one electronic device transmits a synchronization beacon, an SDF, or the like in a wakeup state, on the basis of the updated and shared AADW bitmap of the other electronic devices.

According to an embodiment of the present disclosure, a method of operating an electronic device may include configuring a cluster with an electronic device through a proximity network, acquiring active duration information of a discovery window for the electronic device, and communicating with the electronic device on the basis of the active duration information.

The proximity network may be a near field communication network to which an NAN communication standard is applied. The active duration information of the discovery window may be an AADW bitmap. The active duration information of the discovery window may be transmitted by being included in a service discovery frame of an NAN communication standard applied to the proximity network.

The active duration information of the discovery window may be transmitted by being included in a reserved area of an NAN attributes field of the service discovery frame. The active duration information of the discovery window may be transmitted by being included in a vendor specific attribute area of an NAN attributes field of the service discovery frame. The active duration information of the discovery window may be transmitted by being included in a service descriptor attribute area of an NAN attributes field of the service discovery frame.

The service descriptor attribute area may include a service IDentifier (ID) field and a service Info field, wherein the service ID field includes a service ID for the active duration information of the discovery window, and wherein the service information field includes the active duration information of the discovery window.

The method may further include, if the active duration information of the discovery window of the electronic device is changed while communicating with another electronic device, transmitting the changed active duration information of the discovery window to the other electronic device. The active duration information of the discovery window of the electronic device may be changed by at least one of a change in a power state and a change in operation state of the electronic device.

The method may further include, if the changed active duration information of the discovery window of an electronic device is acquired while communicating with the electronic device, changing the active duration information of the discovery window of another electronic device in accordance with the acquired active duration information.

As described above, according to an embodiment of the present disclosure, each electronic device configured in a cluster as a proximity network, for example, on the basis of an NAN communication standard shares active duration information of a DW configured differently or changed on the basis of a power state or an operation state or the like, and transmits/receives a signal in an active duration in which electronic devices in the cluster can receive the signal on the basis of the shared active duration information, thereby being able to increase certainty of signal transmission and to avoid unnecessary power consumption.

While the present disclosure has been illustrated and described with reference to embodiments thereof, it will be understood by those skilled in the art that various changes in form and details may be made therein without departing from the scope and spirit of the present disclosure as defined by the appended claims and their equivalents.

What is claimed is:

1. A portable electronic device operable in a wireless local area network, the portable electronic device comprising:
communication circuitry to support a neighbor awareness networking in relation with the wireless local area network; and
a processor configured to:
detect, using the communication circuitry, an electronic device external to the portable electronic device;
transmit, using the communication circuitry, information to the electronic device, wherein the information includes a plurality of bits indicating an interval between a plurality of discovery windows in which the portable electronic device is to be operated in a wake-up state with respect to the neighbor awareness networking;
adjust the interval based at least in part on a power state with respect to the portable electronic device; and
transmit another information indicating the adjusted interval to the electronic device.

2. The portable electronic device of claim 1, wherein the processor is further configured to:
transition, in relation with the neighbor awareness networking, the portable electronic device from a sleep state to the wake-up state based at least in part on the adjusted interval.

3. The portable electronic device of claim 2, wherein the processor is further configured to:
receive content from the electronic device during the wake-up state.

4. The portable electronic device of claim 1, wherein the processor is further configured to:
transition, in relation with the neighbor awareness networking, the portable electronic device from the wake-up state to the sleep state during the adjusted interval.

5. The portable electronic device of claim 1, wherein a first time duration corresponding to the adjusted interval is greater than a second time duration corresponding to at least one of the plurality of discovery windows.

6. The portable electronic device of claim 1, wherein the processor is further configured to:
perform the adjusting of the interval based at least in part on a determination that the power state with respect to the portable electronic device is changed from a first power state to a second power state using a lower power than the first power state.

7. The portable electronic device of claim 1, wherein the processor is further configured to:
establish a wireless connection with the electronic device, such that the portable electronic device and the electronic device are grouped into a cluster with respect to neighbor awareness networking based at least in part on the wireless connection.

8. A portable electronic device operable in a wireless local area network, the portable electronic device comprising:
communication circuitry; and
a processor configured to:
detect, using the communication circuitry, an electronic device external to the portable electronic device in the wireless local area network;
transmit, using the communication circuitry, a signal indicating a plurality of discovery windows spaced at a first interval;
adjust the first interval to a second interval based at least in part on a power state with respect to the portable electronic device; and
transmit another signal indicating another plurality of discovery windows spaced at the second interval.

9. The portable electronic device of claim 8, wherein the processor is further configured to:
transition, in relation with the wireless local area network, the portable electronic device from a sleep state to a wake-up state based at least in part on the second interval.

10. The portable, electronic device of claim 9, wherein the processor is further configured to:
receive content from the electronic device during the wake-up state.

11. The portable electronic device of claim 8, wherein a first time duration corresponding to the second interval is greater than a second time duration corresponding to at least one of the other plurality of discovery windows.

12. The portable electronic device of claim 8, wherein the processor is further configured to:
perform the adjusting of the first interval to the second interval based at least in part on a determination that the power state with respect to the portable electronic device is changed from a first power state to a second power state using a lower power than the first power state.

13. The portable electronic device of claim 8, wherein the processor is further configured to:
establish, using the communication circuitry, a wireless connection with the electronic device, such that the portable electronic device and the electronic device are grouped into a cluster with respect to the wireless local area network based at least in part on the wireless connection.

14. The portable electronic device of claim 8, wherein the processor is further configured to:
receive, from the electronic device, information indicating another interval in which the electronic device is to be operated in a wake-up state with respect to the wireless local area network.

15. A non-transitory machine-readable storage device storing instructions that, when executed by one or more processors, cause the one or more processors to perform operations comprising:
detecting, at a portable electronic device, via a wireless communication, an electronic device external to the portable electronic device in a wireless local area network;
transmitting, via the wireless communication, information to the electronic device, wherein the information includes a plurality of bits indicating an interval between a plurality of discovery windows in which the portable electronic device is to be operated in a wake-up state with respect to the wireless communication;
adjusting the interval based at least in part on a power state with respect to the portable electronic device; and
transmitting another information indicating the adjusted interval to the electronic device.

16. The non-transitory machine-readable storage device of claim 15, wherein the operations further comprise:
transitioning, in relation with the wireless local area network, the portable electronic device from a sleep state to the wake-up state based at least in part on the adjusted interval.

17. The non-transitory machine-readable storage device of claim 15, wherein the operations further comprise:
receiving content from the electronic device during the wake-up state.

18. The non-transitory machine-readable storage device of claim 15, wherein a first time duration corresponding to the adjusted interval is greater than a second time duration corresponding to at least one of the plurality of discovery windows.

19. The non-transitory machine-readable storage device of claim 15, wherein the operations further comprise:
performing the adjusting of the interval based at least in part on a determination that the power state with respect to the portable electronic device is changed from a first power state to a second power state using a lower power than the first power state.

20. The non-transitory machine-readable storage device of claim 15, wherein the operations further comprise:
establishing, via the wireless communication, a wireless connection with the electronic device, such that the portable electronic device and the electronic device are grouped into a cluster with respect to the wireless local area network based at least in part on the wireless connection.

* * * * *